US010289131B2

(12) United States Patent
Steinberg

(10) Patent No.: US 10,289,131 B2
(45) Date of Patent: *May 14, 2019

(54) SYSTEM AND METHOD FOR USING A WIRELESS DEVICE AS A SENSOR FOR AN ENERGY MANAGEMENT SYSTEM

(71) Applicant: EcoFactor, Inc., Redwood City, CA (US)

(72) Inventor: John Douglas Steinberg, Millbrae, CA (US)

(73) Assignee: EcoFactor, Inc., Redwood City, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/002,791

(22) Filed: Jan. 21, 2016

(65) Prior Publication Data

US 2016/0138822 A1 May 19, 2016

Related U.S. Application Data

(63) Continuation of application No. 13/470,074, filed on May 11, 2012, now Pat. No. 9,244,470, which is a (Continued)

(51) Int. Cl.
*G05D 23/00* (2006.01)
*G05D 23/19* (2006.01)
(Continued)

(52) U.S. Cl.
CPC .............. *G05D 23/00* (2013.01); *F24F 11/30* (2018.01); *F24F 11/62* (2018.01); *F24F 11/70* (2018.01);
(Continued)

(58) Field of Classification Search
CPC .......... F24F 11/006; F24F 11/70; F24F 11/62; F24F 11/30; F24F 11/56; F24F 2120/12;
(Continued)

(56) References Cited

U.S. PATENT DOCUMENTS 4,136,732 A 1/1979 Demaray et al.
4,270,693 A 6/1981 Hayes
(Continued)

FOREIGN PATENT DOCUMENTS

EP 0415747 A2 3/1991
EP 1102500 A2 5/2001
(Continued)

OTHER PUBLICATIONS

Raji, "Smart Networks for Control", IEEE Spectrum, Jun. 1994.
(Continued)

*Primary Examiner* — Ajay Ojha
(74) *Attorney, Agent, or Firm* — Knobbe, Martens, Olson & Bear, LLP

(57) ABSTRACT

The invention comprises systems and methods for detecting the use of networked consumer electronics devices as indications of occupancy of a structure for purposes of automatically adjusting the temperature setpoint on a thermostatic HVAC control. At least one thermostat is located inside a structure and is used to control an HVAC system in the structure. At least one networked electronic device is used to indicate the state of occupancy of the structure. The state of occupancy is used to alter the setpoint on the thermostatic HVAC control to reduce unneeded conditioning of unoccupied spaces.

18 Claims, 8 Drawing Sheets

Related U.S. Application Data continuation of application No. 12/502,064, filed on Jul. 13, 2009, now Pat. No. 8,180,492.

(60) Provisional application No. 61/134,714, filed on Jul. 14, 2008.

(51) Int. Cl.

| | | |
|---|---|---|
| *G05B 15/02* | (2006.01) | |
| *G06N 7/00* | (2006.01) | |
| *F24F 11/30* | (2018.01) | |
| *F24F 11/62* | (2018.01) | |
| *F24F 11/70* | (2018.01) | |
| F24F 120/10 | (2018.01) | |
| F24F 120/12 | (2018.01) | |
| F24F 120/14 | (2018.01) | |
| F24F 140/60 | (2018.01) | |
| F24F 120/20 | (2018.01) | |
| F24F 11/63 | (2018.01) | |
| F24F 11/56 | (2018.01) | |
| F24F 11/46 | (2018.01) | |

(52) U.S. Cl.
CPC ......... *G05B 15/02* (2013.01); *G05D 23/1902* (2013.01); *G06N 7/005* (2013.01); *F24F 11/46* (2018.01); *F24F 11/56* (2018.01); *F24F 11/63* (2018.01); *F24F 2120/10* (2018.01); *F24F 2120/12* (2018.01); *F24F 2120/14* (2018.01); *F24F 2120/20* (2018.01); *F24F 2140/60* (2018.01)

(58) Field of Classification Search
CPC ........ F24F 2120/10; F24F 11/63; F24F 11/46; F24F 2120/20; F24F 2140/60; F24F 2120/14; G05B 15/02; G06N 7/005; G05D 23/1902
See application file for complete search history.

(56) References Cited

U.S. PATENT DOCUMENTS

| | | | |
|---|---|---|---|
| 4,341,345 | A | 7/1982 | Hammer et al. |
| 4,403,644 | A | 9/1983 | Hebert |
| 4,451,879 | A | 5/1984 | Welch et al. |
| 4,475,685 | A | 10/1984 | Grimado et al. |
| 4,655,279 | A | 4/1987 | Harmon |
| 4,674,027 | A | 6/1987 | Beckey |
| 4,675,828 | A | 6/1987 | Winston |
| 4,702,305 | A | 10/1987 | Beckey et al. |
| 4,702,413 | A | 10/1987 | Beckey et al. |
| 4,897,798 | A | 1/1990 | Cler |
| 5,124,502 | A | 6/1992 | Nelson et al. |
| 5,244,146 | A | 9/1993 | Jefferson et al. |
| 5,270,952 | A | 12/1993 | Adams et al. |
| 5,279,458 | A | 1/1994 | Dewolf et al. |
| 5,297,838 | A | 3/1994 | Juravich |
| 5,314,004 | A | 5/1994 | Strand et al. |
| 5,348,078 | A | 9/1994 | Dushane et al. |
| 5,454,511 | A | 10/1995 | Van Ostrand et al. |
| 5,462,225 | A | 10/1995 | Massara et al. |
| 5,544,036 | A | 8/1996 | Brown et al. |
| 5,555,927 | A | 9/1996 | Shah |
| 5,572,438 | A | 11/1996 | Ehlers et al. |
| 5,682,949 | A | 11/1997 | Ratcliffe et al. |
| 5,706,190 | A | 1/1998 | Russ et al. |
| 5,717,609 | A | 2/1998 | Packa et al. |
| 5,725,148 | A | 3/1998 | Hartman |
| 5,729,474 | A | 3/1998 | Hildebrand et al. |
| 5,818,347 | A | 10/1998 | Dolan et al. |
| 5,839,654 | A | 11/1998 | Weber |
| 5,977,964 | A | 11/1999 | Williams et al. |
| 6,079,626 | A | 6/2000 | Hartman |
| 6,115,713 | A | 9/2000 | Pascucci et al. |
| 6,145,751 | A | 11/2000 | Ahmed |
| 6,178,362 | B1 | 1/2001 | Woolard et al. |
| 6,216,956 | B1 | 4/2001 | Ehlers et al. |
| 6,223,544 | B1 | 5/2001 | Seem |
| 6,241,156 | B1 | 6/2001 | Kline et al. |
| 6,260,765 | B1 | 7/2001 | Natale et al. |
| 6,351,693 | B1 | 2/2002 | Monie |
| 6,400,958 | B1 | 6/2002 | Richton |
| 6,400,996 | B1 | 6/2002 | Hoffberg et al. |
| 6,437,692 | B1 | 8/2002 | Petite et al. |
| 6,449,534 | B1 | 9/2002 | Stewart |
| 6,454,177 | B1 | 9/2002 | Sasao et al. |
| 6,478,233 | B1 | 11/2002 | Shah |
| 6,480,803 | B1 | 11/2002 | Pierret et al. |
| 6,483,906 | B1 | 11/2002 | Lggulden et al. |
| 6,536,675 | B1 | 3/2003 | Pesko et al. |
| 6,542,076 | B1 | 4/2003 | Joao |
| 6,549,130 | B1 | 4/2003 | Joao |
| 6,574,537 | B2 | 6/2003 | Kipersztok et al. |
| 6,580,950 | B1 | 6/2003 | Johnson |
| 6,594,826 | B1 | 7/2003 | Goldschmidtlki et al. |
| 6,595,430 | B1 | 7/2003 | Shah |
| 6,598,056 | B1 | 7/2003 | Hull et al. |
| 6,619,555 | B2 | 9/2003 | Rosen |
| 6,622,097 | B2 | 9/2003 | Hunter |
| 6,622,115 | B1 | 9/2003 | Brown et al. |
| 6,622,925 | B2 | 9/2003 | Carner et al. |
| 6,622,926 | B1 | 9/2003 | Sartain et al. |
| 6,628,997 | B1 | 9/2003 | Fox et al. |
| 6,633,823 | B2 | 10/2003 | Bartone et al. |
| 6,643,567 | B2 | 11/2003 | Kolk et al. |
| 6,644,098 | B2 | 11/2003 | Cardinale et al. |
| 6,671,680 | B1 | 12/2003 | Davis et al. |
| 6,695,218 | B2 | 2/2004 | Fleckenstein |
| 6,700,224 | B2 | 3/2004 | Biskup, Sr. |
| 6,726,113 | B2 | 4/2004 | Guo |
| 6,731,992 | B1 | 5/2004 | Ziegler |
| 6,734,806 | B1 | 5/2004 | Cratsley |
| 6,772,062 | B2 | 8/2004 | Amundsen |
| 6,785,592 | B1 | 8/2004 | Smith |
| 6,785,630 | B2 | 8/2004 | Kolk |
| 6,788,421 | B2 | 9/2004 | Rosen |
| 6,789,739 | B2 | 9/2004 | Rosen |
| 6,845,918 | B2 | 1/2005 | Rotondo |
| 6,853,959 | B2 | 2/2005 | Ikeda et al. |
| 6,868,293 | B1 | 3/2005 | Schurr |
| 6,868,319 | B2 | 3/2005 | Kipersztok et al. |
| 6,882,712 | B1 | 4/2005 | Iggulden et al. |
| 6,889,908 | B2 | 5/2005 | Crippen et al. |
| 6,891,838 | B1 | 5/2005 | Petite et al. |
| 6,912,429 | B1 | 6/2005 | Bilger |
| 6,981,383 | B2 | 1/2006 | Shah et al. |
| 6,991,029 | B2 | 1/2006 | Orfield et al. |
| 7,009,493 | B2 | 3/2006 | Howard |
| 7,031,880 | B1 | 4/2006 | Seem et al. |
| 7,039,532 | B2 | 5/2006 | Hunter |
| 7,061,393 | B2 | 6/2006 | Buckingham et al. |
| 7,089,088 | B2 | 8/2006 | Terry et al. |
| 7,130,719 | B2 | 10/2006 | Ehlers et al. |
| 7,130,832 | B2 | 10/2006 | Bannai et al. |
| H2176 | H | 12/2006 | Meyer et al. |
| 7,167,079 | B2 | 1/2007 | Smyth et al. |
| 7,187,986 | B2 | 3/2007 | Johnson et al. |
| 7,205,892 | B2 | 4/2007 | Luebke et al. |
| 7,206,670 | B2 | 4/2007 | Pimputkar et al. |
| 7,215,746 | B2 | 5/2007 | Iggulden et al. |
| 7,216,015 | B2 | 5/2007 | Poth |
| 7,231,424 | B2 | 6/2007 | Bodin et al. |
| 7,232,075 | B1 | 6/2007 | Rosen |
| 7,242,988 | B1 | 7/2007 | Hoffberg et al. |
| 7,260,823 | B2 | 8/2007 | Schlack et al. |
| 7,356,384 | B2 | 4/2008 | Gull et al. |
| 7,476,020 | B2 | 1/2009 | Zufferey et al. |
| 7,483,964 | B1 | 1/2009 | Jackson et al. |
| 7,590,469 | B2 | 9/2009 | Grohman |
| 7,644,869 | B2 | 1/2010 | Hoglund et al. |
| 7,702,424 | B2 | 4/2010 | Cannon et al. |
| 7,758,729 | B1 | 7/2010 | DeWhitt |

(56) References Cited

U.S. PATENT DOCUMENTS

| | | |
|---|---|---|
| 7,784,704 B2 | 8/2010 | Harter |
| 7,848,900 B2 | 12/2010 | Steinberg et al. |
| 7,869,904 B2 | 1/2011 | Cannon et al. |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 7,983,795 B2 | 7/2011 | Josephson et al. |
| 8,010,237 B2 | 8/2011 | Cheung et al. |
| 8,019,567 B2 | 9/2011 | Steinberg et al. |
| D646,990 S | 10/2011 | Rhodes |
| 8,090,477 B1 | 1/2012 | Steinberg |
| 8,131,497 B2 | 3/2012 | Steinberg et al. |
| 8,131,506 B2 | 3/2012 | Steinberg et al. |
| D659,560 S | 5/2012 | Rhodes |
| 8,180,492 B2 | 5/2012 | Steinberg |
| 8,340,826 B2 | 12/2012 | Steinberg et al. |
| D673,467 S | 1/2013 | Lee et al. |
| 8,412,488 B2 | 4/2013 | Steinberg et al. |
| 8,423,322 B2 | 4/2013 | Steinberg et al. |
| 8,428,782 B2 | 4/2013 | Imes |
| 8,428,785 B2 | 4/2013 | Boucher et al. |
| 8,457,797 B2 | 6/2013 | Imes et al. |
| 8,498,753 B2 | 7/2013 | Steinberg et al. |
| 8,556,188 B2 | 10/2013 | Steinberg |
| 8,596,550 B2 | 12/2013 | Steinberg et al. |
| 8,712,590 B2 | 4/2014 | Steinberg |
| D705,095 S | 5/2014 | Steinberg et al. |
| 8,738,327 B2 | 5/2014 | Steinberg et al. |
| 8,740,100 B2 | 6/2014 | Steinberg |
| 8,751,186 B2 | 6/2014 | Steinberg et al. |
| 8,840,033 B2 | 9/2014 | Steinberg |
| 8,850,348 B2 | 9/2014 | Fadell et al. |
| 8,886,488 B2 | 11/2014 | Steinberg et al. |
| 9,057,649 B2 | 6/2015 | Steinberg et al. |
| 9,134,710 B2 | 9/2015 | Cheung et al. |
| 9,194,597 B2 | 11/2015 | Steinberg et al. |
| 9,244,470 B2 | 1/2016 | Steinberg |
| 9,279,594 B2 | 3/2016 | Steinberg |
| 9,709,292 B2 | 7/2017 | Steinberg |
| 9,791,839 B2 | 10/2017 | Matsuoka et al. |
| 9,939,333 B2 | 4/2018 | Steinberg et al. |
| 10,018,371 B2 | 7/2018 | Steinberg et al. |
| 10,048,706 B2 | 8/2018 | Hublou et al. |
| 2001/0025349 A1 | 9/2001 | Sharood et al. |
| 2003/0040934 A1 | 2/2003 | Skidmore et al. |
| 2004/0065095 A1 | 4/2004 | Osborne et al. |
| 2004/0117330 A1 | 6/2004 | Ehlers et al. |
| 2004/0133314 A1 | 7/2004 | Ehlers et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2006/0283965 A1 | 12/2006 | Mueller et al. |
| 2007/0043477 A1 | 2/2007 | Ehlers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0083834 A1 | 4/2008 | Krebs et al. |
| 2008/0198549 A1 | 8/2008 | Rasmussen et al. |
| 2008/0281472 A1 | 11/2008 | Podgorny et al. |
| 2009/0005070 A1 | 1/2009 | Forstall et al. |
| 2009/0018673 A1 | 1/2009 | Dushane et al. |
| 2009/0052859 A1 | 2/2009 | Greenberger et al. |
| 2009/0057426 A1 | 3/2009 | Sullivan et al. |
| 2009/0062970 A1 | 3/2009 | Forbes et al. |
| 2009/0065596 A1* | 3/2009 | Seem .................. F24F 11/30 236/51 |
| 2009/0099699 A1 | 4/2009 | SteInberg et al. |
| 2009/0125151 A1 | 5/2009 | Steinberg et al. |
| 2009/0188985 A1 | 7/2009 | Scharing et al. |
| 2009/0240381 A1 | 9/2009 | Lane |
| 2009/0271013 A1 | 10/2009 | Chen |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |
| 2010/0162285 A1 | 6/2010 | Cohen et al. |
| 2010/0211224 A1 | 8/2010 | Keeling et al. |
| 2010/0235004 A1 | 9/2010 | Thind |
| 2010/0289643 A1 | 11/2010 | Trundle et al. |
| 2010/0318227 A1 | 12/2010 | Steinberg et al. |
| 2011/0031323 A1 | 2/2011 | Nold et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0253796 A1 | 10/2011 | Posa et al. |
| 2011/0290893 A1 | 12/2011 | Steinberg |
| 2011/0307101 A1 | 12/2011 | Imes et al. |
| 2012/0023225 A1 | 1/2012 | Imes et al. |
| 2012/0046859 A1 | 2/2012 | Imes et al. |
| 2012/0064923 A1 | 3/2012 | Imes et al. |
| 2012/0065935 A1 | 3/2012 | SteInberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0135759 A1 | 5/2012 | Imes et al. |
| 2012/0186774 A1 | 7/2012 | Matsuoka et al. |
| 2012/0216725 A1 | 8/2012 | Imes et al. |
| 2012/0221151 A1 | 8/2012 | Steinberg |
| 2012/0221718 A1 | 8/2012 | Imes et al. |
| 2012/0262430 A1 | 10/2012 | Imes et al. |
| 2012/0324119 A1 | 12/2012 | Imes et al. |
| 2013/0053054 A1 | 2/2013 | Lovitt et al. |
| 2013/0054758 A1 | 2/2013 | Imes et al. |
| 2013/0054863 A1 | 2/2013 | Imes et al. |
| 2013/0060387 A1 | 3/2013 | Imes et al. |
| 2013/0073094 A1 | 3/2013 | Knapton et al. |
| 2013/0144453 A1 | 6/2013 | Subbloie |
| 2013/0167035 A1 | 6/2013 | Imes et al. |
| 2013/0173064 A1 | 7/2013 | Fadell et al. |
| 2013/0178985 A1 | 7/2013 | Lombard et al. |
| 2013/0226502 A1 | 8/2013 | Steinberg et al. |
| 2013/0310989 A1 | 11/2013 | Steinberg et al. |
| 2013/0338837 A1 | 12/2013 | Hublou et al. |
| 2014/0039690 A1 | 2/2014 | Steinberg |
| 2014/0058567 A1 | 2/2014 | Matsuoka et al. |
| 2014/0229018 A1 | 8/2014 | Steinberg |
| 2014/0316581 A1 | 10/2014 | Fadell et al. |
| 2015/0021405 A1 | 1/2015 | Steinberg |
| 2015/0025691 A1 | 1/2015 | Fadell et al. |
| 2015/0043615 A1 | 2/2015 | Steinberg et al. |
| 2015/0120235 A1 | 4/2015 | Steinberg et al. |
| 2015/0142180 A1 | 5/2015 | Matsuoka et al. |
| 2015/0168001 A1 | 6/2015 | Steinberg |
| 2016/0061474 A1 | 3/2016 | Cheung et al. |
| 2016/0091219 A1 | 3/2016 | Steinberg et al. |
| 2016/0097557 A1 | 4/2016 | Steinberg |
| 2016/0238270 A1 | 8/2016 | Steinberg |
| 2016/0258822 A1 | 9/2016 | Steinberg et al. |
| 2016/0363337 A1 | 12/2016 | Steinberg et al. |
| 2017/0241662 A1 | 8/2017 | Steinberg et al. |
| 2017/0336090 A1 | 11/2017 | Steinberg |
| 2018/0087793 A1 | 3/2018 | Okita et al. |
| 2018/0087795 A1 | 3/2018 | Okita et al. |
| 2018/0216841 A1 | 8/2018 | Steinberg |

FOREIGN PATENT DOCUMENTS

| | | |
|---|---|---|
| EP | 2372263 A2 | 5/2011 |
| GB | 2408592 A | 6/2005 |

(56) References Cited

FOREIGN PATENT DOCUMENTS

| | | |
|---|---|---|
| JP | 05-189659 | 7/1993 |
| JP | 2010-038377 | 2/2010 |
| JP | 2010-286218 | 12/2010 |
| KR | 10-1994-0011902 | 6/1994 |
| KR | 10-1999-0070368 | 9/1999 |
| KR | 10-2000-0059532 | 10/2000 |
| WO | WO 2005/098331 A1 | 10/2005 |
| WO | WO 2009/036764 A2 | 3/2009 |
| WO | WO 2011/011404 A1 | 1/2011 |
| WO | WO 2011/100427 A2 | 8/2011 |
| WO | WO 2011/149600 | 12/2011 |
| WO | WO 2012/024534 | 2/2012 |
| WO | WO 2013/187996 | 12/2013 |

OTHER PUBLICATIONS

Cheng et al., "Smart Sensors Enable Smart Air Conditioning Control", Sensors 2014, ISSN 1424-8220, Jun. 24, 2014, 25 pages.
Gunes et al., "Improving Energy Efficiency and Thermal Comfort of Smart Buildings with HVAC Systems in the Presence of Sensor Faults", IEEE, Aug. 24-26, 2015, 6 pages.
Simmini et al., Energy Efficient Control and Fault Detection for HVAC Systems, Univ. of Padova, XXVI Series, 2014, 144 pages.
Sklavounos, "Detection of Abnormal Situations and Energy Efficiency Control in Heating Ventilation and Air Conditioning (HVAC) Systems", Brunel University thesis, Sep. 2015,151 pages.
U.S. Appl. No. 12/805,705, filed Jun. 10, 2010, Crabtree.
U.S. Appl. No. 13/470,074, filed Aug. 30, 2012, Steinberg.
U.S. Appl. No. 13/523,697, filed Jun. 14, 2012, Hublou et al.
U.S. Appl. No. 13/725,447, filed Jun. 6, 2013, Steinberg.
U.S. Appl. No. 13/729,401, dated Dec. 28, 2012, Sloop.
U.S. Appl. No. 13/852,577, filed Mar. 28, 2013, Steinberg et al.
U.S. Appl. No. 13/858,710, filed Sep. 5, 2013, Steinberg et al.
U.S. Appl. No. 13/861,189, filed Apr. 11, 2013, Steinberg et al.
U.S. Appl. No. 14/082,675, filed Nov. 18, 2003, Steinberg et al.
U.S. Appl. No. 14/263,762, filed Apr. 28, 2014, Steinberg.
U.S. Appl. No. 14/285,384, filed May 22, 2014, Steinberg, et al.
U.S. Appl. No. 14/292,377, filed May 30, 2014, Steinberg
U.S. Appl. No. 14/491,554, filed Sep. 19, 2014, Steinberg.
U.S. Appl. No. 14/527,433, filed Oct. 29, 2014, Steinberg, et al.
U.S. Appl. No. 14/731,221, filed Jun. 4, 2015, Steinberg, et al.
Arens, et al., "How Ambient Intelligence Will Improve Habitability and Energy Efficiency in Buildings", 2005, research paper, Center for the Built Environment, Controls and Information Technology.
Bourhan, et al., "Cynamic model of an HVAC system for control analysis", Elsevier 2004.
Brush, et al., Preheat—Controlling Home Heating with Occupancy Prediction, 2013.
Comverge SuperStat Flyer, prior to Jun. 28, 2007.
Control4 Wireless Thermostat Brochure, 2006.
Cooper Power Systems Web Page, 2000-2009.
Emerson Climate Technologies, "Network Thermostat for E2 Building Controller Installation and Operation Manual", 2007.
Enernoc Web Page, 2004-2009.
Enerwise Website, 1999-2009.
Gupta, Adding GPS-Control to Traditional Thermostats: An Exploration of Potential Energy Savings and Design Challenges, MIT, 2009.
Gupta, et al., A Persuasive GPS-Controlled Thermostat System, MIT, 2008.
Honeywell Programmable Thermostat Owner's Guide, www.honeywell.com/yourhome, 2004.
Honeywell, W7600/W7620 Controller Reference Manual, HW0021207, Oct. 1992.
Johnson Controls, "T600HCx-3 Single-Stage Thermostats", 2006.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.
Krumm, et al., Learning Time-Based Presence Probabilities, Jun. 2011.
Lin, et al., "Multi-Sensor Single-Actuator Control of HVAC Systems", 2002.
Pier, Southern California Edison, Demand Responsive Control of Air Conditioning via Programmable Communicating Thermostats Draft Report, Feb. 14, 2006.
Proliphix Thermostat Brochure, prior to Jun. 2007.
Scott, et al., Home Heating Using GPS-Based Arrival Prediction, 2010.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for nonsmooth simulation-based optimization, Building and Environment 39, 2004, pp. 989-999.
International Search Report and Written Opinion for PCT/US2013/035726, dated Aug. 6, 2013.
Written Opinion and Search Report for PCT/US2011/032537, dated Dec. 12, 2011.
International Preliminary Report on Patentability in PCT/US2013/035726 dated Dec. 16, 2014.
U.S. Appl. No. 15/616,719, filed Jun. 7, 2017, Steinberg, et al.
Office Action in Canadian Application No. 2800491 dated Dec. 7, 2016.
Search Report in European Application No. 11787067.5 dated Aug. 14, 2017.
Extended Search Report for European Application No. 11818805.1 dated Jun. 9, 2017.
Examination Report in Australian Application No. 2013274827 dated Apr. 11, 2017.
Extended Search Report for European Application No. 13804057.1 dated Jun. 1, 2016.

\* cited by examiner

SYSTEM AND METHOD FOR USING A WIRELESS DEVICE AS A SENSOR FOR AN ENERGY MANAGEMENT SYSTEM

RELATED APPLICATIONS

Any and all applications for which a foreign or domestic priority claim is identified in the Application Data Sheet, or any correction thereto, are hereby incorporated by reference into this application under 37 CFR 1.57.

BACKGROUND OF THE INVENTION

Field of the Invention

This invention relates to the use of thermostatic HVAC and other energy management controls that are connected to a computer network. More specifically, the present invention pertains to the use of user interactions with an interface such as a personal computer or an Internet-enabled television as signal related to occupancy to inform an energy management system.

Heating and cooling systems for buildings (heating, ventilation and cooling, or HVAC systems) have been controlled for decades by thermostats. At the most basic level, a thermostat includes a means to allow a user to set a desired temperature, a means to sense actual temperature, and a means to signal the heating and/or cooling devices to turn on or off in order to try to change the actual temperature to equal the desired temperature. The most basic versions of thermostats use components such as a coiled bi-metallic spring to measure actual temperature and a mercury switch that opens or completes a circuit when the spring coils or uncoils with temperature changes. More recently, electronic digital thermostats have become prevalent. These thermostats use solid-state devices such as thermistors or thermal diodes to measure temperature, and microprocessor-based circuitry to control the switch and to store and operate based upon user-determined protocols for temperature vs. time.

These programmable thermostats generally offer a very restrictive user interface, limited by the cost of the devices, the limited real estate of the small wall-mounted boxes, and the inability to take into account more than two variables: the desired temperature set by the user, and the ambient temperature sensed by the thermostat. Users can generally only set one series of commands per day, and in order to change one parameter (e.g., to change the late-night temperature) the user often has to cycle through several other parameters by repeatedly pressing one or two buttons.

Because the interface of programmable thermostats is so poor, the significant theoretical savings that are possible with them (sometimes cited as 25% of heating and cooling costs) are rarely realized. In practice, studies have found that more than 50% of users never program their thermostats at all. Significant percentages of the thermostats that are programmed are programmed sub-optimally, in part because, once programmed, people tend to not to re-invest the time needed to change the settings very often.

A second problem with standard programmable thermostats is that they represent only a small evolutionary step beyond the first, purely mechanical thermostats. Like the first thermostats, they only have two input signals—ambient temperature and the preset desired temperature. The entire advance with programmable thermostats is that they can shift between multiple present temperatures at different times without real-time involvement of a human being.

Because most thermostats control HVAC systems that do not offer infinitely variable output, traditional thermostats are designed to permit the temperature as seen by the thermostat to vary above and below the setpoint to prevent the HVAC system from constantly and rapidly cycling on and off, which is inefficient and harmful to the HVAC system. The temperature range in which the thermostat allows the controlled environment to drift is known as both the dead zone and, more formally, the hysteresis zone. The hysteresis zone is frequently set at +/−1 degree Fahrenheit. Thus if the setpoint is 68 degrees, in the heating context the thermostat will allow the inside temperature to fall to 67 degrees before turning the heating system on, and will allow it to rise to 69 degrees before turning it off again.

As energy prices rise, more attention is being paid to ways of reducing energy consumption. Because energy consumption is directly proportional to setpoint—that is, the further a given setpoint diverges from the balance point (the inside temperature assuming no HVAC activity) in a given house under given conditions, the higher energy consumption will be to maintain temperature at that setpoint), energy will be saved by virtually any strategy that over a given time frame lowers the average heating setpoint or raises the cooling setpoint. Conventional programmable thermostats allow homeowners to save money and energy by pre-programming setpoint changes based upon comfort or schedule. For example, in the summer, allowing the setpoint to rise by several degrees (or even shutting off the air conditioner) when the home is unoccupied will generally save significantly on energy. But such thermostats have proven to be only minimally effective in practice. Because they have such primitive user interfaces, they are difficult to program, and so many users never bother at all, or set them up once and do not alter the programming even if their schedules change.

In the hotel industry, the heating and cooling decisions made in hundred or even thousands of individual rooms with independently controlled HVAC systems are aggregated into a single energy bill, so hotel owners and managers are sensitive to energy consumption by those systems. Hotel guests often turn the air conditioner to a low temperature setting and then leave the room for hours at a time, thereby wasting considerable energy. An approach commonly used outside of the United States to combat this problem is to use a keycard to control the HVAC system, such that guests place the keycard into a slot mounted on the wall near the door of the room which then triggers the lights and HVAC system to power up, and turn them off when the guest removes the card upon leaving the room. However, because most hotels give each guest two cards, it is easy to simply leave the extra card in the slot, thus defeating the purpose of the system. Recently, systems have been introduced in which a motion sensor is connected to the control circuitry for the HVAC system. If no motion is detected in the room for some predetermined interval, the system concludes that the room is unoccupied, and turns off or alters the setpoint of the HVAC system to a more economical level. When the motion sensor detects motion (which is assumed to coincide with the return of the guest), the HVAC system resets to the guest's chosen setting.

Adding occupancy detection capability to residential HVAC systems could also add considerable value in the form of energy savings without significant tradeoff in terms of comfort. But the systems used in hotels do not easily transfer to the single-family residential context. Hotel rooms tend to be small enough that a single motion sensor is sufficient to determine with a high degree of accuracy whether or not the room is occupied. A single motion sensor in the average home today would have limited value because there are likely to be many places one or more people could be home and active yet invisible to the motion sensor. The most economical way to include a motion sensor in a traditional programmable thermostat would be to build it into the thermostat itself. But thermostats are generally located in hallways, and thus are unlikely to be exposed to the areas where people tend to spend their time. Wiring a home with multiple motion sensors in order to maximize the chances of detecting occupants would involve considerable expense, both for the sensors themselves and for the considerable cost of installation, especially in the retrofit market. Yet if control is ceded to a single-sensor system that cannot reliably detect presence, the resulting errors would likely lead the homeowner to reject the system.

It would thus be desirable to provide a system that could detect occupancy without requiring the installation of additional hardware; that could accurately detect occupancy regardless of which room in the house is occupied, and could optimize energy consumption based upon dynamic and individually configurable heuristics.

SUMMARY OF THE INVENTION

In one embodiment, the invention comprises a thermostat attached to an HVAC system, a local network connecting the thermostat to a larger network such as the Internet, and one or more computers attached to the network, and a server in bi-directional communication with a plurality of such thermostats and computers. The server pairs each thermostat with one or more computers or other consumer electronic devices which are determined to be associated with the home in which the thermostat is located. The server logs the ambient temperature sensed by each thermostat vs. time and the signals sent by the thermostats to their HVAC systems. The server also monitors and logs activity on the computers or other consumer electronic devices associated with each thermostat. Based on the activity patterns evidenced by keystrokes, cursor movement or other inputs, or lack thereof, the server instructs the thermostat to change temperature settings between those optimized for occupied and unoccupied states.

At least one embodiment of the invention comprises the steps of determining whether one or more networked electronic devices inside a structure are in use; determining whether said use of said networked electronic devices indicates occupancy of said structure; and adjusting the temperature setpoint on a thermostatic controller for an HVAC system for said structure based upon whether or not said structure is deemed to be occupied.

At least one embodiment of the invention comprises at least one said thermostat having at least one temperature setting associated with the presence of one or more occupants in said structure, and at least one temperature setting associated with the absence of occupants in said structure; one or more electronic devices having at least a user interface; where said electronic devices and said thermostat are connected to a network; where said setpoint on said thermostat is adjusted between said temperature setting associated with the presence of one or more occupants in said structure and said temperature setting associated with the absence of occupants in said structure based upon the use of said user interface for said electronic device.

DETAILED DESCRIPTION OF THE PREFERRED EMBODIMENT

Figure 1:
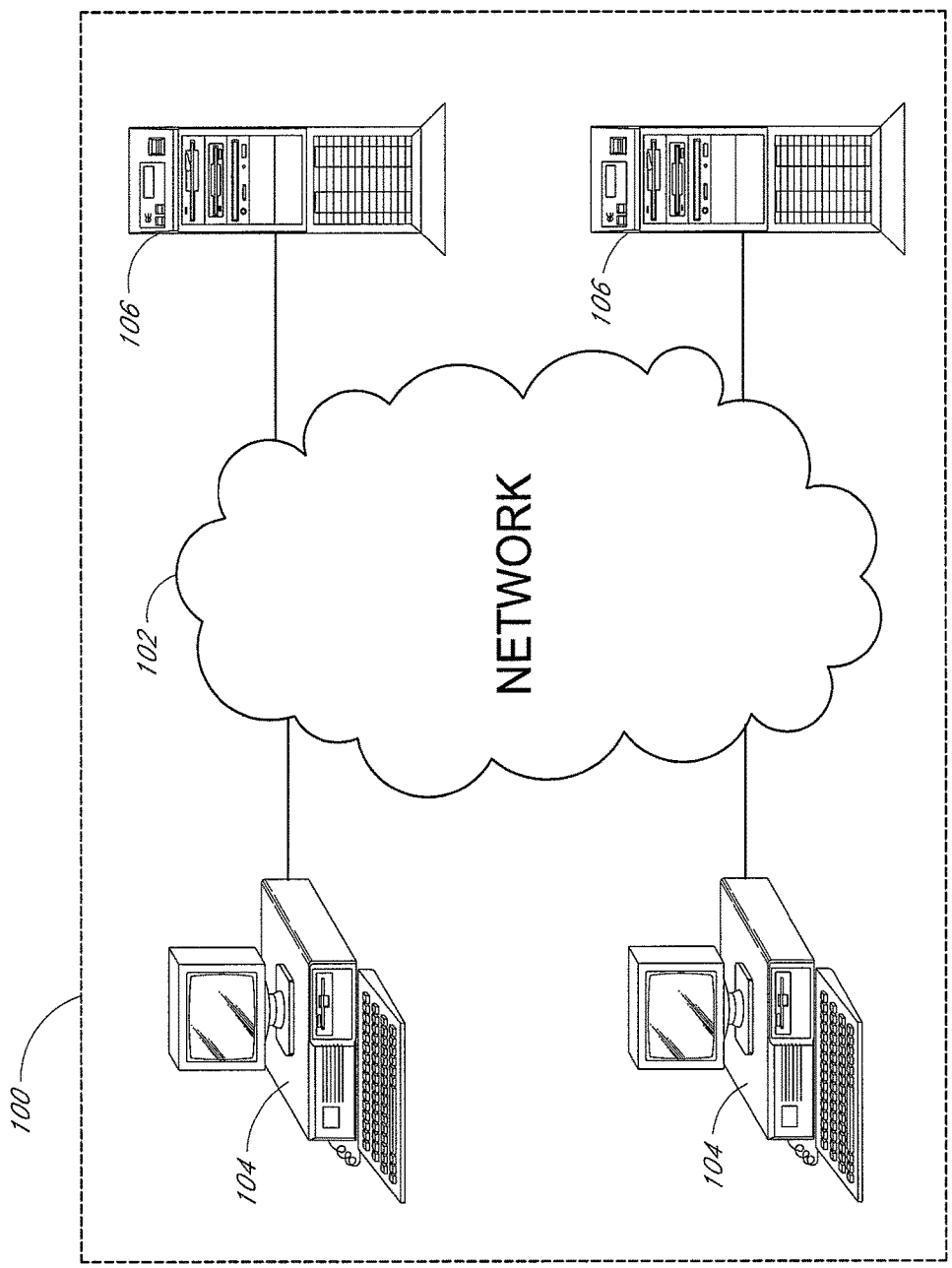
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

When a user of the subject invention wishes to access information on network 102, the buyer initiates connection from his computer 104. For example, the user invokes a browser, which executes on computer 104. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network. Computers 104 can also be microprocessor-controlled home entertainment equipment including advanced televisions, televisions paired with home entertainment/media centers, and wireless remote controls.

Computers 104 may utilize a browser configured to interact with the World Wide Web. Such browsers may include Microsoft Explorer, Mozilla, Firefox, Opera or Safari. They may also include browsers or similar software used on handheld, home entertainment and wireless devices. The storage medium may comprise any method of storing information. It may comprise random access memory (RAM), electronically erasable programmable read only memory (EEPROM), read only memory (ROM), hard disk, floppy disk, CD-ROM, optical memory, or other method of storing data. Computers 104 and 106 may use an operating system such as Microsoft Windows, Apple Mac OS, Linux, Unix or the like. Computers 106 may include a range of devices that provide information, sound, graphics and text, and may use a variety of operating systems and software optimized for distribution of content via networks.

Figure 2:
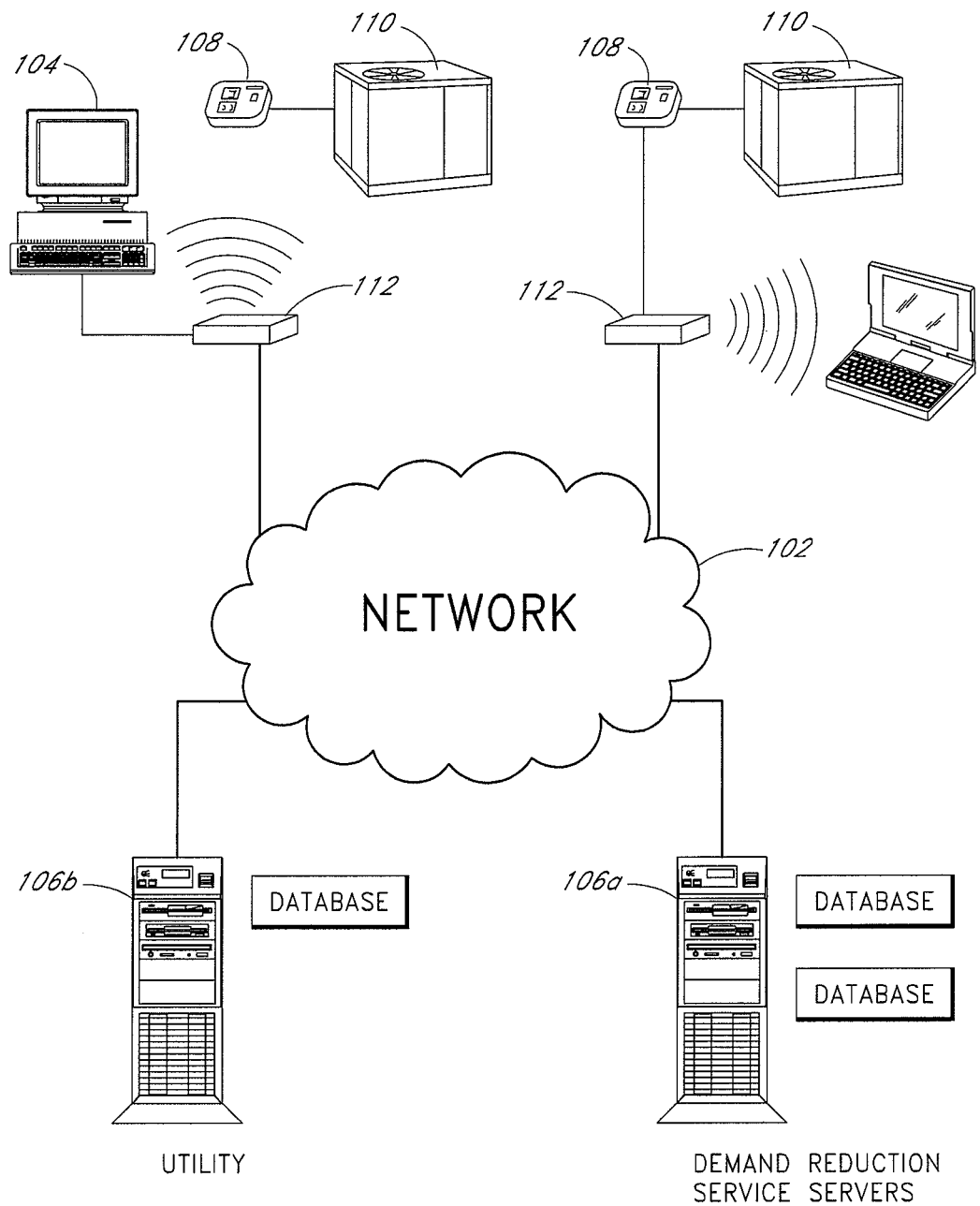
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the server 106 via wired or wireless connection such as Ethernet or a wireless protocol such as IEEE 802.11, a gateway 112 that connects the computer and thermostat to the Internet via a broadband connection such as a digital subscriber line (DSL) or other form of broadband connection to the World Wide Web. Server 106 contains the content to be served as web pages and viewed by computers 104, as well as databases containing information used by the servers.

Figure 3:
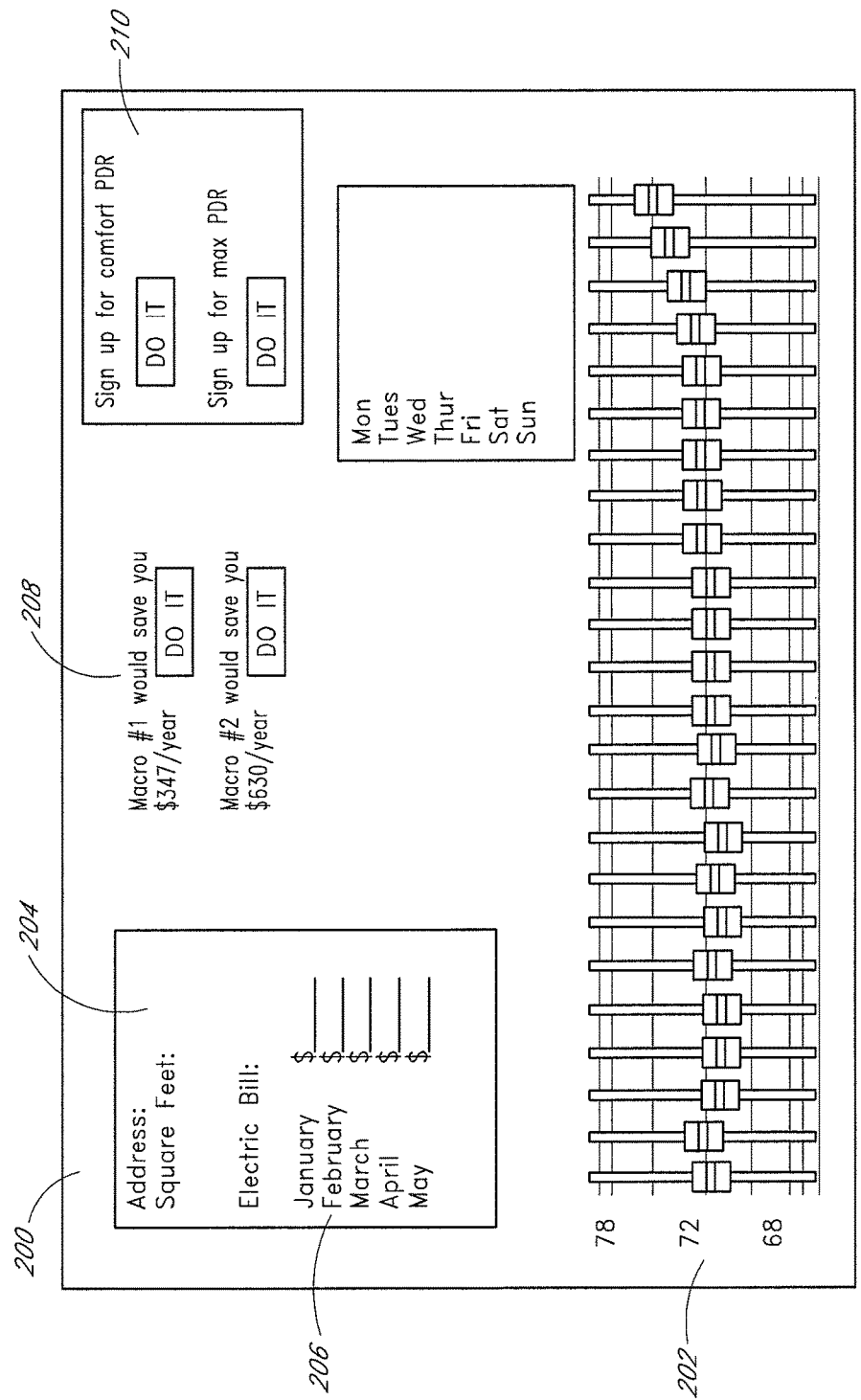
FIG. 3 shows an embodiment of the website to be used as part of the subject invention.

In the currently preferred embodiment, the website 200 includes a number of components accessible to the user, as shown in FIG. 3. Those components may include a means to enter temperature settings 202, a means to enter information about the user's home 204, a means to enter the user's electricity bills 206, means to calculate energy savings that could result from various thermostat-setting strategies 208, and means to enable and choose between various arrangements 210 for demand reduction with their electric utility provider as intermediated by the demand reduction service provider.

Figure 4:
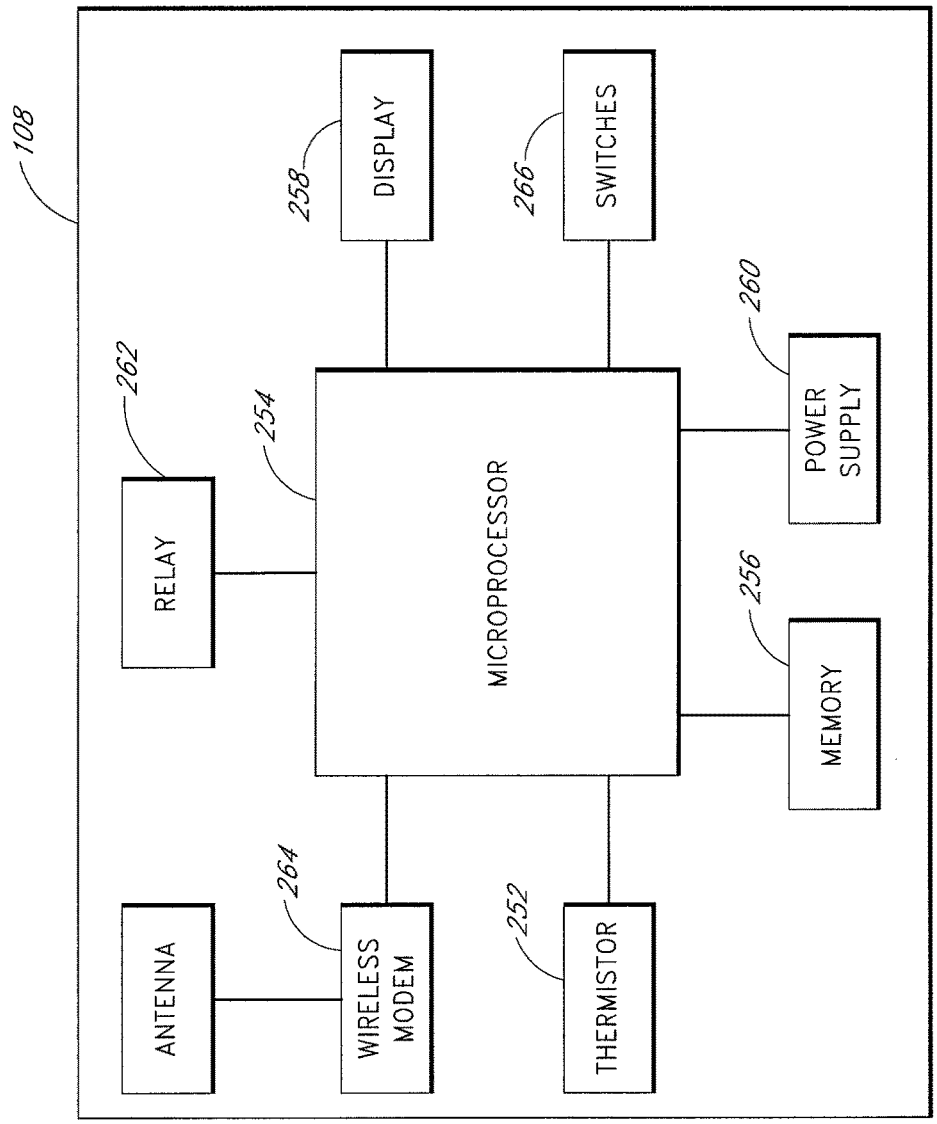
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, a relay 262, which turns the HVAC system on an and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wireless network. Such means could be in the form of Ethernet, wireless protocols such as IEEE 802.11, IEEE 802.15.4, Bluetooth, cellular systems such as CDMA, GSM and GPRS, or other wireless protocols. The thermostat 250 may also include controls 266 allowing users to change settings directly at the thermostat, but such controls are not necessary to allow the thermostat to function.

Figure 5:
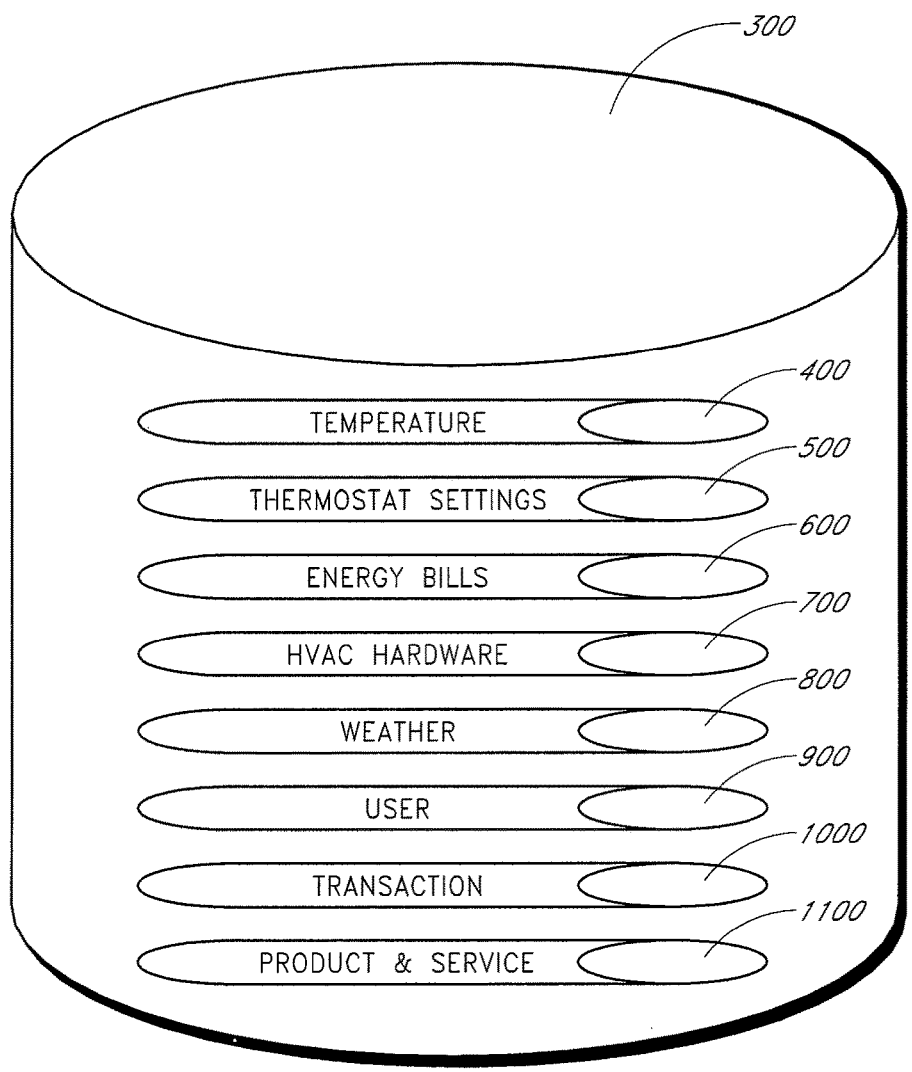
FIG. 5 shows one embodiment of the database structure used as part of the subject invention.

The data used to generate the content delivered in the form of the website is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website 200 will allow users of connected thermostats 250 to create personal accounts. Each user's account will store information in database 900, which tracks various attributes relative to users of the site. Such attributes may include the make and model of the specific HVAC equipment in the user's home; the age and square footage of the home, the solar orientation of the home, the location of the thermostat in the home, the user's preferred temperature settings, whether the user is a participant in a demand reduction program, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

Figure 6:
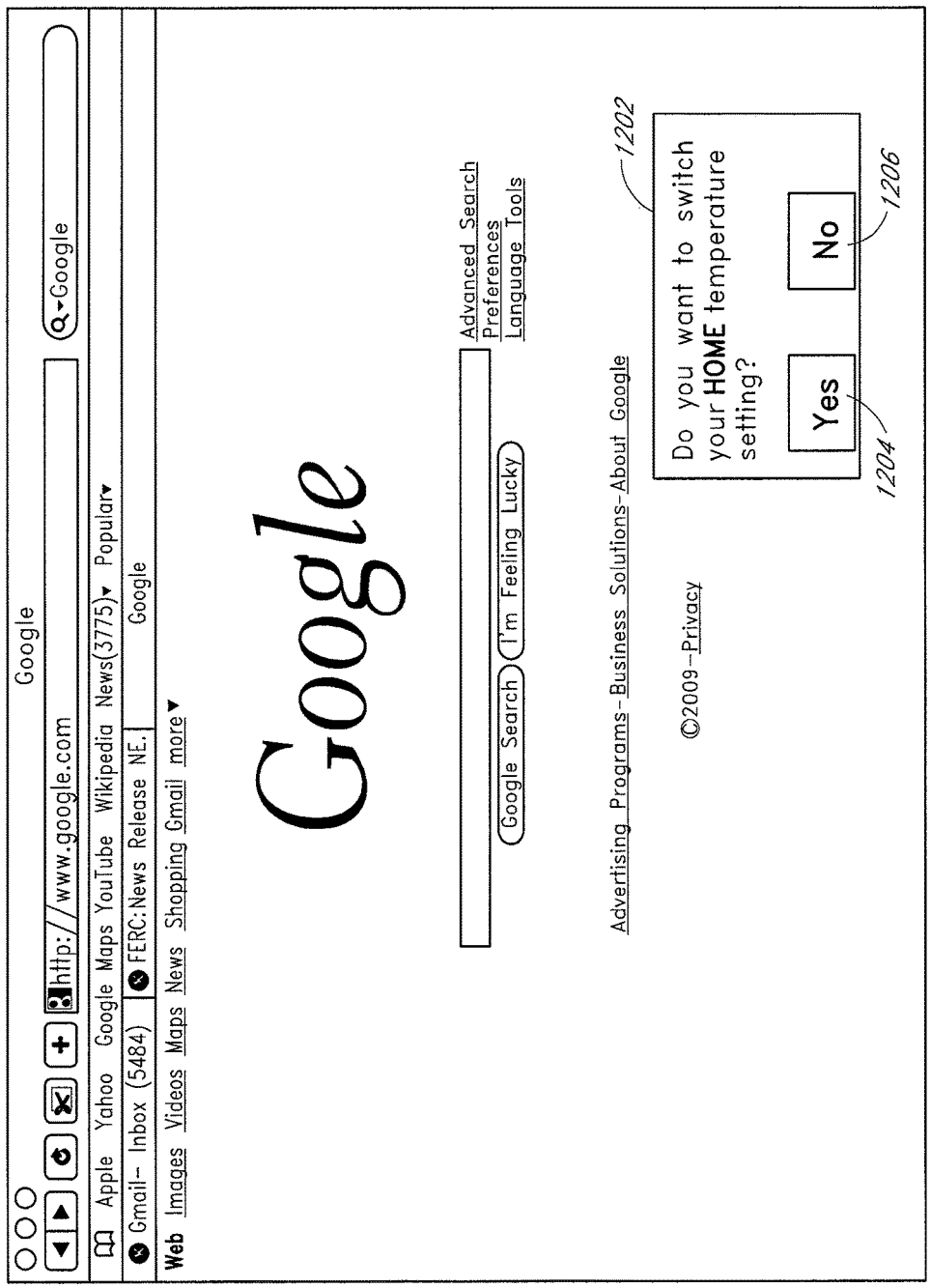
FIG. 6 shows the browser as seen on the display of the computer used as part of the subject invention.

FIG. 6 represents the screen of a computer or other device 104 using a graphical user interface connected to the Internet. The screen shows that a browser 1200 is displayed on computer 104. In one embodiment, a background application installed on computer 104 detects activity by a user of the computer, such as cursor movement, keystrokes or otherwise, and signals the application running on server 106 that activity has been detected. Server 106 may then, depending on context, (a) transmit a signal to thermostat 108 changing setpoint because occupancy has been detected at a time when the system did not expect occupancy; (b) signal the background application running on computer 104 to trigger a software routine that instantiates a pop-up window 1202 that asks the user if the server should change the current setpoint, alter the overall programming of the system based upon a new occupancy pattern, etc. The user can respond by clicking the cursor on "yes" button 1204 or "No" button 1206. Equivalent means of signalling activity may be employed with interactive television programming, gaming systems, etc.

Figure 7:
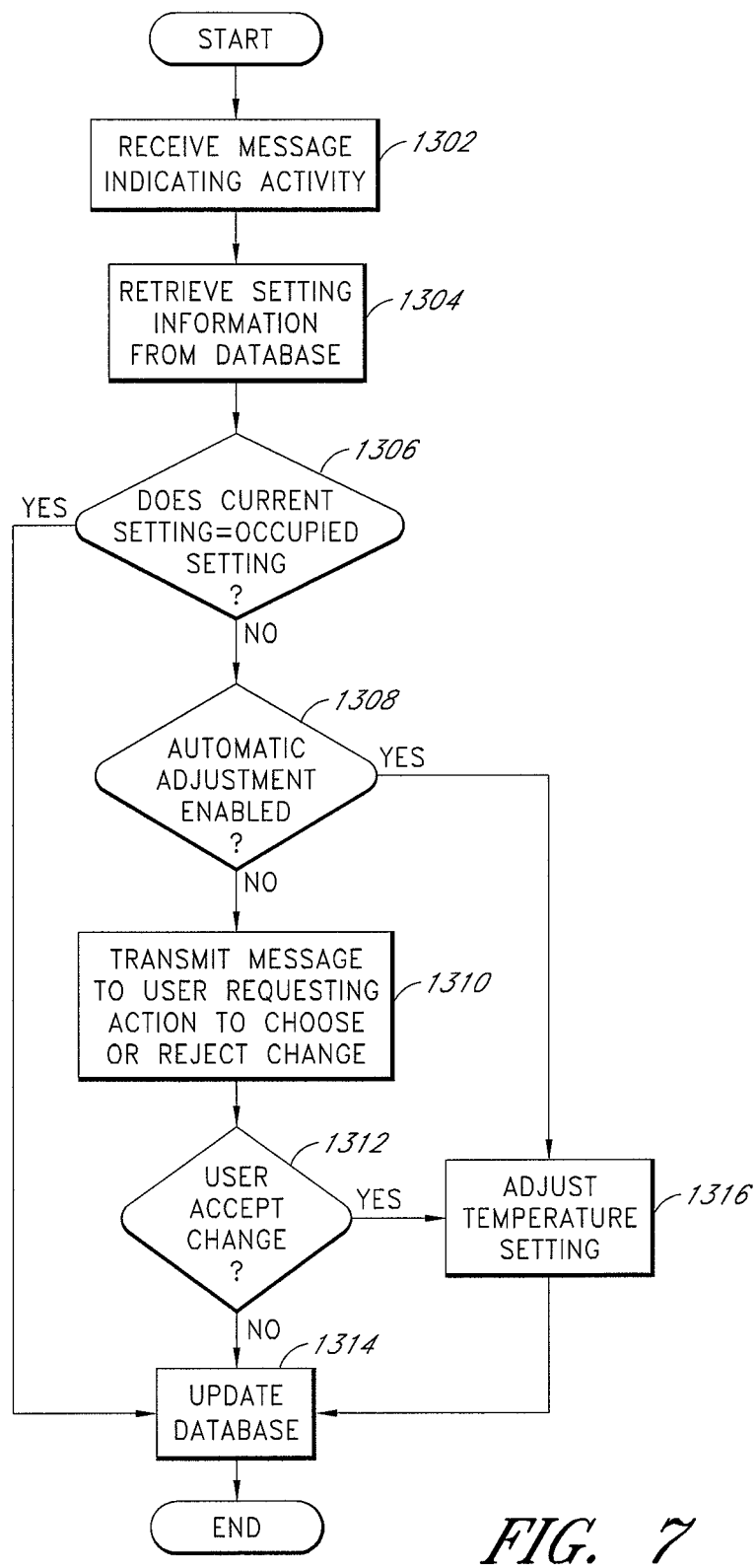
FIG. 7 is a flowchart showing the steps involved in the operation of one embodiment of the subject invention.

FIG. 7 represents a flowchart showing the steps involved in the operation of one embodiment of the subject invention. In step 1302, computer 104 transmits a message to server 106 via the Internet indicating that there is user activity on computer 104. This activity can be in the form of keystrokes, cursor movement, input via a television remote control, etc. In step 1304 the application queries database 300 to retrieve setting information for the HVAC system. In step 1306 the application determines whether the current HVAC program is intended to apply when the home is occupied or unoccupied. If the HVAC settings then in effect are intended to apply for an occupied home, then the application terminates for a specified interval. If the HVAC settings then in effect are intended to apply when the home is unoccupied, then in step 1308 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 1316, in which it changes the programmed setpoint for the thermostat to the setting intended for the house when occupied. If the user has previously specified that the application should not make such changes without further user input, then in step 1310 the application transmits a command to computer 104 directing the browser to display a message informing the user that the current setting assumes an unoccupied house and asking the user in step 1312 to choose whether to either keep the current settings or revert to the pre-selected setting for an occupied home. If the user selects to retain the current setting, then in step 1314 the application will write to database 300 the fact that the users has so elected and terminate. If the user elects to change the setting, then in step 1316 the application transmits the revised setpoint to the thermostat. In step 1314 the application writes the updated setting information to database 300.

Figure 8:
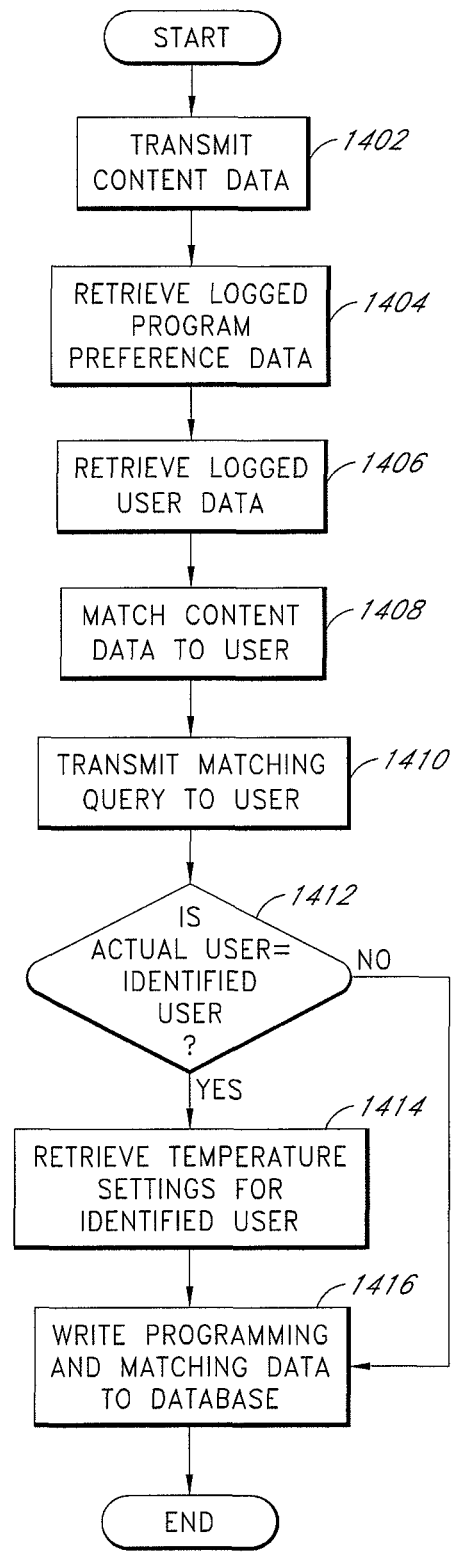
FIG. 8 is a flowchart that shows how the invention can be used to select different HVAC settings based upon its ability to identify which of multiple potential occupants is using the computer attached to the system.

FIG. 8 is a flowchart that shows how the invention can be used to select different HVAC settings based upon its ability to identify which of multiple potential occupants is using the computer attached to the system. In step 1402 computer 104 transmits to server 106 information regarding the type of activity detected on computer 104. Such information could include the specific program or channel being watched if, for example, computer 104 is used to watch television. The information matching, for example, TV channel 7 at 4:00 PM on a given date to specific content may be made by referring to Internet-based or other widely available scheduling sources for such content. In step 1404 server 106 retrieves from database 300 previously logged data regarding viewed programs. In step 1406 server 106 retrieves previously stored data regarding the residents of the house. For example, upon initiating the service, one or more users may have filled out online questionnaires sharing their age, gender, schedules, viewing preferences, etc. In step 1408, server 106 compares the received information about user activity to previously stored information retrieved from database 300 about the occupants and their viewing preferences. For example, if computer 104 indicates to server 106 that the computer is being used to watch golf, the server may conclude that an adult male is watching; if computer 104 indicates that it is being used to watch children's programming, server 106 may conclude that a child is watching. In step 1410 the server transmits a query to the user in order to verify the match, asking, in effect, "Is that you. Bob?" In step 1412, based upon the user's response, the application determines whether the correct user has been identified. If the answer is no, then the application proceeds to step 1416. If the answer is yes, then in step 1414 the application retrieves the temperature settings for the identified occupant. In step 1416 the application writes to database 300 the programming information and information regarding matching of users to that programming.

In an alternative embodiment, the application running on computer 104 may respond to general user inputs (that is, inputs not specifically intended to instantiate communication with the remote server) by querying the user whether a given action should be taken. For example, in a system in which the computer 104 is a web-enabled television or web-enabled set-top device connected to a television as a display, software running on computer 104 detects user activity, and transmits a message indicating such activity to server 106. The trigger for this signal may be general, such as changing channels or adjusting volume with the remote control or a power-on event. Upon receipt by server 104 of this trigger, server 104 transmits instructions to computer 104 causing it to display a dialog box asking the user whether the user wishes to change HVAC settings.

What is claimed is:

1. A method for varying temperature setpoints for an HVAC system comprising:
   storing at least a first HVAC temperature setpoint and at least a second HVAC temperature setpoint;
   monitoring an activity status of at least one wireless device associated with one or more occupants of said structure, wherein said wireless device comprises a graphic user interface that can be used to view video content, wherein use of said wireless device comprises at least one of cursor movement, keystrokes or other user interface actions intended to alter a state of said wireless device;
   determining a probability that the specific activity status of said wireless device is associated with the use of said wireless device by a specific occupant or occupants of said structure, where said probability is determined in part by the video content of the program or channel being viewed by said occupant on or with said wireless device and where said video content is not explicitly related to temperature setpoints;
   determining whether a current HVAC temperature setpoint associated with said HVAC system is set to said first HVAC temperature setpoint or said second temperature setpoint;
   prompting said one or more users, wherein said prompting sends a message to said wireless device recommending a change to said current HVAC temperature setpoint for said HVAC system;
   in response to said prompting, receiving input from said one or more users; and
   keeping said current HVAC temperature setpoint based upon said input from said one or more users.

2. The method of claim 1 wherein said wireless device is a remote control.

3. The method of claim 1 wherein said wireless device is a wireless phone.

4. The method of claim 3 wherein said wireless phone is connected to a cellular network.

5. The method of claim 1 wherein said wireless device is a tablet computer.

6. The method of claim 1 wherein said first and second HVAC temperature setpoints are stored in a database associated with a remote server.

7. The method of claim 1 in which said wireless device communicates with a remote server.

8. The method of claim 1 further comprising adjusting said current HVAC temperature setpoint with a remote computer.

9. The method of claim 1 in which said first HVAC temperature setpoint is varied automatically based on said input from said one or more users.

10. A system for altering the setpoint on a thermostat for space conditioning of a structure comprising:
    at least one thermostat having at least a first temperature setpoint and at least a second temperature setpoint;

at least one wireless device associated with one or more occupants of said structure, wherein said wireless device comprises a graphic user interface that can be used to view video content, wherein use of said wireless device comprises at least one of cursor movement, keystrokes or other user interface actions intended to alter a state of said wireless device;

an application comprising one or more computer processors that receives data regarding an activity status of said wireless device and whether said thermostat is set to said first temperature setpoint, said application determining a probability that the specific activity status of said wireless device is associated with the use of said wireless device by a specific occupant or occupants of said structure, where said probability is determined in part by the video content of the program or channel being viewed by said occupant on or with said wireless device and where said video content is not explicitly related to temperature setpoints;

said application prompting said one or more users wherein said application provides electronic notice to one or more of said users of said wireless device that said thermostat is set to one of said first temperature setpoint or said second temperature setpoint; and wherein said application in response to said prompting, receives input from said one or more users; and wherein said current temperature setpoint is set based upon said input from said one or more users.

11. The system of claim 10 wherein said wireless device is a remote controller.

12. The system of claim 10 wherein said wireless device is a wireless phone.

13. The system of claim 12 wherein said wireless phone is connected to a cellular network.

14. The system of claim 10 said wireless device is a tablet computer.

15. The system of claim 10 wherein said first and second temperature setpoints are stored in a database associated with a remote server.

16. The system of claim 10 wherein said wireless device communicates with a remote server.

17. The system of claim 10 further comprising a remote computer that varies said first temperature setpoint.

18. The system of claim 10 in which said first temperature setpoint is varied automatically based on said input from said one or more users.

* * * * *